US007901212B2

(12) United States Patent
Quinn et al.

(10) Patent No.: US 7,901,212 B2
(45) Date of Patent: Mar. 8, 2011

(54) MOBILE COLLAPSED BUILDING SIMULATOR

(75) Inventors: Thomas Quinn, Lincoln University, PA (US); Kerry Oswald, Lincoln University, PA (US); Michael Quinn, West Grove, PA (US)

(73) Assignee: Personal Protection Equipment Specialists, Lincoln University, PA (US)

( * ) Notice: Subject to any disclaimer, the term of this patent is extended or adjusted under 35 U.S.C. 154(b) by 622 days.

(21) Appl. No.: 11/950,432

(22) Filed: Dec. 5, 2007

(65) Prior Publication Data

US 2008/0127579 A1 Jun. 5, 2008

Related U.S. Application Data

(60) Provisional application No. 60/872,843, filed on Dec. 5, 2006.

(51) Int. Cl.
*G09B 19/00* (2006.01)

(52) U.S. Cl. .......... 434/226

(58) Field of Classification Search .......... 434/29, 434/219, 226, 247; 52/64; 296/24.3
See application file for complete search history.

(56) References Cited

U.S. PATENT DOCUMENTS

| | | | | |
|---|---|---|---|---|
| 4,001,949 | A * | 1/1977 | Francis | 434/226 |
| 4,526,548 | A * | 7/1985 | Livingston | 434/226 |
| 4,971,377 | A | 11/1990 | Aquilante | |
| 5,173,052 | A * | 12/1992 | Duncan, Jr. | 434/226 |
| 5,203,707 | A | 4/1993 | Musto et al. | |
| 5,226,818 | A * | 7/1993 | Feiock et al. | 434/226 |
| 5,415,551 | A | 5/1995 | Semenza | |
| 5,573,300 | A | 11/1996 | Simmons | |
| 5,752,835 | A | 5/1998 | Whitmer, Sr. | |
| 5,927,990 | A * | 7/1999 | Welch et al. | 434/226 |
| 6,179,620 | B1 | 1/2001 | Schmid | |
| 6,799,975 | B1 * | 10/2004 | Dunn | 434/365 |
| 6,866,513 | B2 | 3/2005 | Hough | |
| 6,889,473 | B2 * | 5/2005 | Westra | 52/64 |
| 7,008,230 | B2 * | 3/2006 | Hoglund | 434/236 |
| 7,074,043 | B1 * | 7/2006 | Jacobson | 434/226 |
| 2003/0124496 | A1 | 7/2003 | Hough | |
| 2003/0175662 | A1 | 9/2003 | Hough | |
| 2005/0233289 | A1 | 10/2005 | Hoglund | |
| 2006/0038072 | A1 | 2/2006 | Schott | |
| 2006/0073449 | A1 * | 4/2006 | Kumar et al. | 434/219 |
| 2006/0101727 | A1 * | 5/2006 | Holgerson et al. | 52/79.1 |
| 2008/0090214 | A1 * | 4/2008 | D'Anneo | 434/226 |

FOREIGN PATENT DOCUMENTS

BR 9902424 9/2001

(Continued)

OTHER PUBLICATIONS

Tom Gallagher Press Release, http://www.fldfs.com/pressoffice/ViewMediaRelease.asp?ID=2178, Nov. 30, 2005.

(Continued)

*Primary Examiner* — Kurt Fernstrom
(74) *Attorney, Agent, or Firm* — RatnerPrestia

(57) ABSTRACT

A mobile collapsed building simulator for use in training fire fighters and emergency personnel. The simulator comprises a trailer body with an interior partitioned into two vertical levels. A plurality of partitions divide the vertical levels into a navigable path through the trailer body. A plurality of obstacles are configured within navigable path to simulate a collapsed building environment.

35 Claims, 10 Drawing Sheets

FOREIGN PATENT DOCUMENTS

| | | |
|---|---|---|
| EP | 0 388 447 | 12/1995 |
| JP | 10282875 A | 10/1998 |
| WO | WO 90/02393 | 3/1990 |
| WO | WO 92/05531 | 4/1992 |

OTHER PUBLICATIONS

Training Division—Effingham Fire Department—Effingham Illinois http://www.effinghamil.com/government/fire_dept/training.html, Oct. 2, 2006.

* cited by examiner

MOBILE COLLAPSED BUILDING SIMULATOR

CROSS REFERENCE TO RELATED APPLICATIONS

This patent application claims the benefit of priority from U.S. Provisional patent application No. 60/872,843, Filed Dec. 5, 2006. The contents of which are incorporated herein by reference.

FIELD OF THE INVENTION

The present invention relates to a mobile collapsed building simulator for training fire fighters and emergency personnel.

BACKGROUND OF THE INVENTION

There continues to be a need for improved collapsed building rescue training in light of terrorist attacks such as the 9/11 tragedy, as well as natural disasters such as tornadoes, hurricanes, and earthquakes. Collapsed buildings present unique dangers to first responders, such as limited or zero visibility, unstable flooring, gas leaks, thick smoke, and live electrical wiring. Current fire fighting training facilities do not realistically reproduce the hazards and extremely confined conditions of a collapsed building. Rescue personnel who are not properly prepared, pose a risk of seriously injuring themselves, trapped victims and other first responders.

There continues to be a need for a simulator that is easily transportable, that can also fit within the envelope of a typical firehouse bay. This flexibility is advantageous for example, for indoor training simulations in urban settings where space is at a premium, as well as other areas where the climate is inclement a significant portion of the year.

SUMMARY OF THE INVENTION

The present invention relates to a mobile collapsed building simulator for training fire fighters and emergency personnel. The simulator comprises a trailer body with an interior partitioned into two vertical levels. A plurality of partitions divide the vertical levels into a navigable path through the trailer body. A plurality of obstacles are configured within navigable path to simulate a collapsed building environment.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

Figure 1:
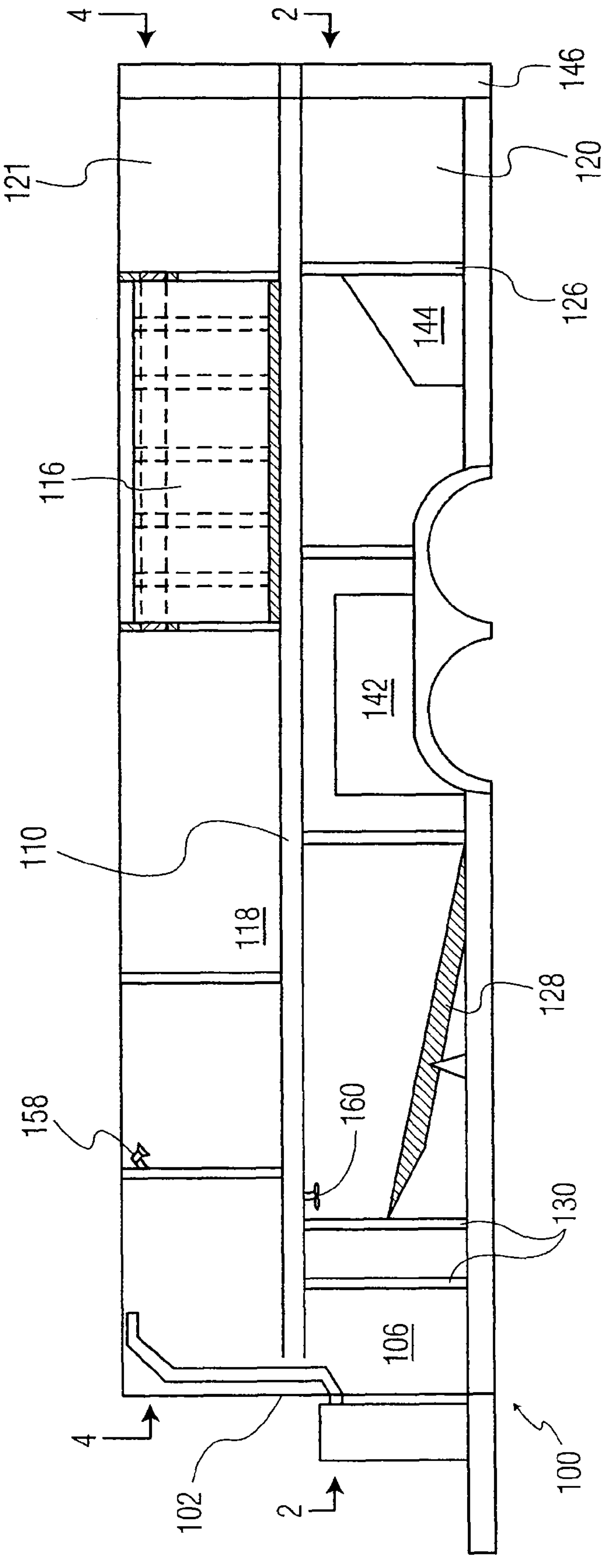
FIG. 1 is a cut away driver's side view of the interior of the mobile collapsed building simulator.
Figure 2:
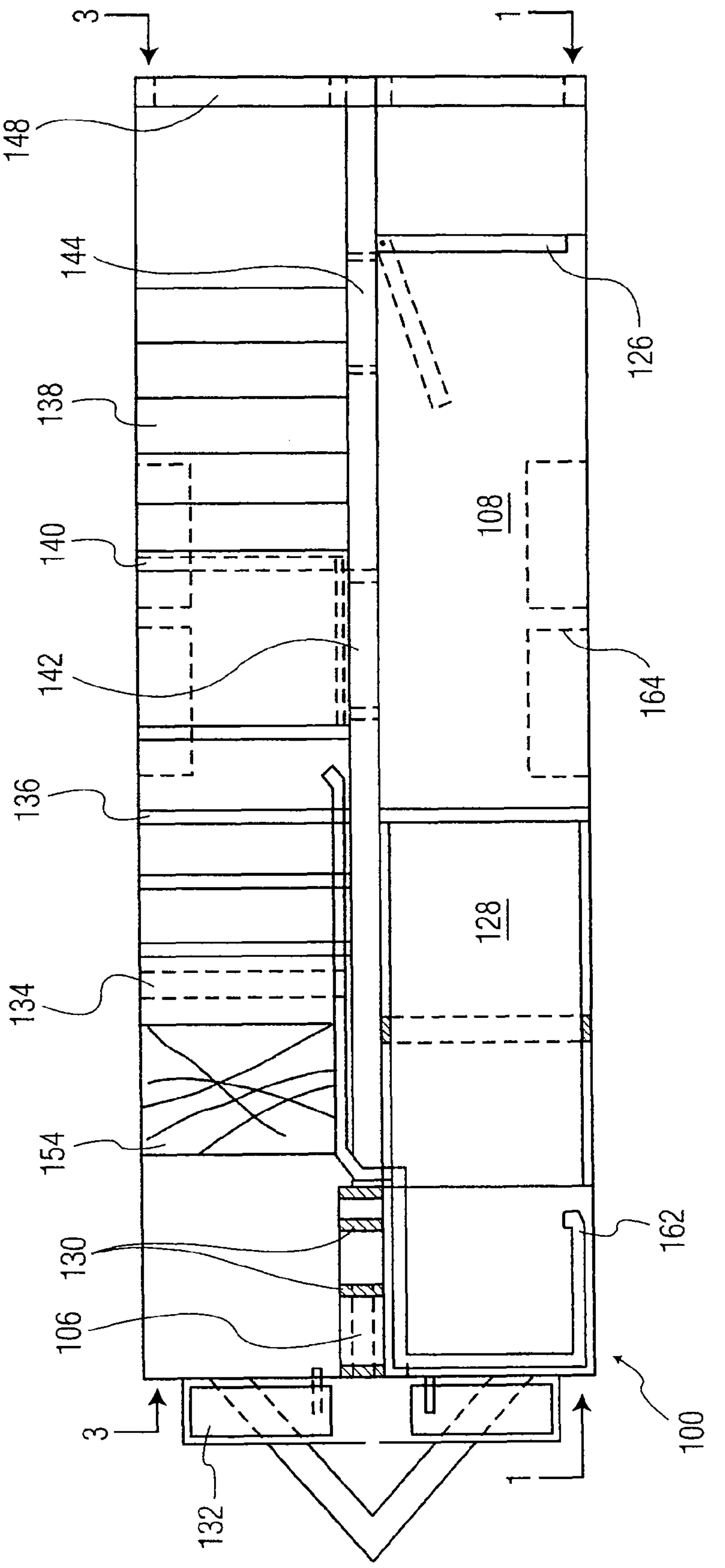
FIG. 2 is a cut away plan view of the first vertical level of the interior of the mobile collapsed building simulator along 2-2.

Referring now to FIG. 1 and FIG. 2, an exemplary embodiment of the mobile collapsed building simulator 100 is provided. The exemplary simulator 100 is constructed within the interior of a tandem axle car trailer 102 having approximate dimensions of about 24 feet in length and 8 feet in width. The trailer 102 typically includes two wheel wells 164 located on both sides of the trailer, a portion of each wheel well extending into an interior portion of the trailer 100. Typically, there may be one or more doors located on at least one side of the trailer 100 for installation, modification, or repair purposes, as well as extraction of trainees. It is contemplated, however, that the simulator may be constructed in trailers of different dimensions.

The trailer 102 is designed to fit within the envelope of a typical fire station truck bay. This configuration for example, allows the trailer to be used in urban settings where space is a premium, and in cities where the weather may be unsuitable for external training exercises. The simulator can also be easily hitched and transported off site so that collapsed building rescue exercises requiring the coordination of several fire teams can be conducted.

In the exemplary embodiment shown in the figures, a structural framework divides the width of the trailer 100, predominantly along the longitudinal axis of the trailer 100. This first structural framework traverses the length of the trailer. In this example, a second structural framework bisects the height of the trailer, and also traverses the length of the trailer 100. In concert, the two structural frameworks define a navigable path through each of two sides of the trailer on each of the two vertical levels 120 and 121 separated by a partition 110. The crawl space height of each vertical level is approximately four feet. The majority of all internal surfaces are painted black and all external sources of light are eliminated to realistically simulate the interior of a collapsed building which typically has no electrical power or light sources. In addition, trainees may traverse the navigable path wearing a self-contained breathing apparatus (air pack), which further simulates the rescue conditions of a collapsed building.

In an exemplary embodiment, the lower vertical level 120 is designed to acquaint trainees to the stresses of operating in a confined space. The rear of the trailer contains a loading ramp. A series of wood planks are connected to the open end of the structural framework at the rear of the trailer. The planks serve as doors that define the entry and exit points 146 of the vertical level 120. Trainees typically enter the simulator from the ramp through the lower left door 146.

Upon entering the simulator, trainees immediately encounter a hinge-mounted repositionable plank 126 that is configured perpendicular to the navigable path such that it completely blocks the navigable path. In an exemplary embodiment, the hinge-mounted repositionable plank 126 is connected to the central structural wooden framework. The hinge of the plank is located on a top or side portion of the plank, and is configured such that when sufficient force is exerted upon the plank, trainees move the plank aside, and may progress forward along the navigable path. In an exemplary embodiment the hinge-mounted repositionable plank 126 is optionally connected by cable to a 10 pound weight. The weight makes it more difficult to move the plank and helps return the plank to its original position behind the trainees once they move completely past the plank. The plank has no handles and is sized and configured such that trainees cannot easily exit the simulator through hinge-mounted repositionable plank 126.

In an exemplary embodiment, trainees continue to crawl along the navigable path in region 108 and encounter the first obstacle, the simulated floor collapse. This exemplary obstacle is an approximately 80 inch by 43 inch fulcrum-mounted plank 128 that is connected to the floor of the trailer. The width of the fulcrum-mounted plank 128 is nearly the exact width of the navigable path thereby forcing trainees to traverse the plank 128 before proceeding. The edges of the fulcrum-mounted plank 128 are mitered such that the leading and trailing edges of the plank 128 may lie approximately flush when contacting the floor of the trailer. The fulcrum is positioned approximately 24 inches from the leading edges of the plank 128 which causes a majority of the fulcrum-mounted plank 128 to be elevated from the floor of the trailer. The absence of light in the simulator obscures the fact that the plank is mounted on a fulcrum. As the trainee traverses the fulcrum-mounted plank 128, the majority of the trainee's weight crosses the fulcrum and the plank 128 shifts downward, thereby simulating a floor collapse. Positioning of the fulcrum and the size of plank are exemplary. The floor may be raised and the location of the fulcrum may be alternatively configured so that the plank "collapses" as soon as the trainee steps on it. Additionally the plank may be configured to be less than the width of the navigable path to simulate a partial floor collapse.

In an exemplary embodiment, trainees next pass through a series of wall studs 130 as they transition from the lower left side to the lower right side of the simulator 100. At least a portion of these wall studs may be concealed by dry wall or mortar board 106 that must be demolished before continued traverse along the navigable path. A top plate of the wall studs 130 is mounted on the underside of the structural framework that divides the trailer vertically in half. The exemplary wall studs 130 are connected to a sole plate, and are positioned on 16 inch centers, which replicates typical mounting distances between wall studs according to most building codes. This narrow width between wall studs 130 requires the majority of trainees to remove their air packs and feed their air packs through the wall studs 130 before re-donning and proceeding along the navigable path. Optionally, the dry wall or mortar board may contain at least one light switch and an least one electrical outlet. Although the electrical socket is not live, trainees must first test the electrical socket and safely remove it before continuing traverse of the navigable path.

Figure 3:
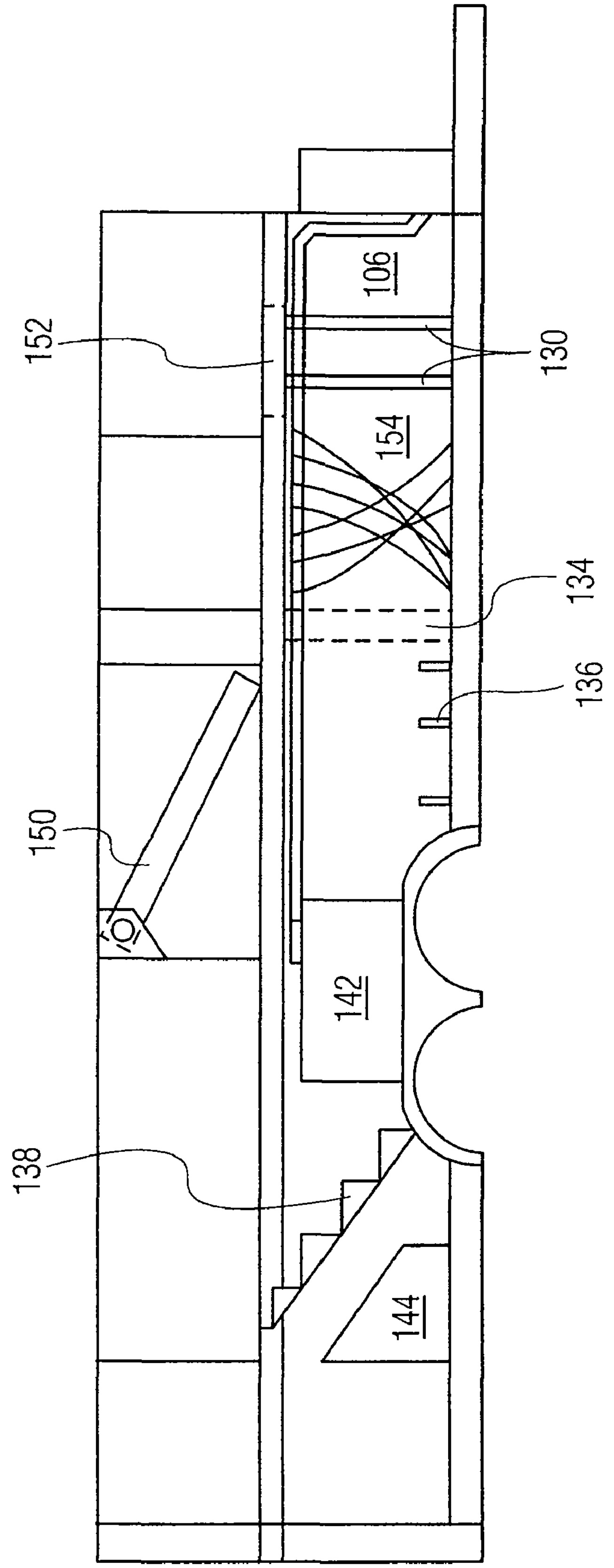
FIG. 3 is a cut away passenger side view of the interior of the mobile collapsed building simulator along lines 3-3.

Referring now to FIG. 2 and FIG. 3, in an exemplary embodiment, trainees next encounter a web of rope entanglements 154 that simulate a collapsed drop-ceiling. In office buildings for example, drop-ceilings typically rest on a framework of suspended thin metal wire. Drop-ceiling panels typically conceal large quantities of electrical wiring and loops of computer network cable. After a structural collapse, these masses of electrical wire and computer cable often hamper rescue operations as they easily snare the air-packs and other equipment of the emergency personnel. The rope entanglements located in the navigable path are configured to simulate this scenario. In the exemplary embodiment, a first loop is connected to a top plate and sole plate such that it contains several swales. A second loop of rope is similarly configured but is positioned such that the swales are perpendicular to the first loop. The ropes are typically comprised of a material having a high-tensile strength, but that can be cut without use of specialized tools or otherwise secured, to allow passage through the entanglements without impediment. In an alternate configuration, ropes are connected to the top plate only and hang down in large swales.

In an alternate exemplary embodiment, the web of entanglements 154 can be removed through a side door, and replaced by a mortar-based or pre-poured concrete wall 134. The concrete or mortar-based wall 134 obstructs a majority of the navigable path and is configured such that at least a majority of the wall must be substantially breached before continued traverse. Trainees use a jackhammer or similar tool to demolish the obstruction.

In an exemplary embodiment, trainees next pass over a series of 2 inch by 8 inch beams 136 arranged on 16 inch centers. The beams are configured to simulate the difficulty of traversing exposed joists.

In an exemplary embodiment, trainees are next presented with a repositionable plank 140. In an exemplary configuration the repositionable plank 140 is configured such that it completely blocks access to the stairs 138. The repositionable plank 140 is be held in place by a locking means such as pin bolts for example. At the same time, partition opening 142 is fully accessible and allows passage between alternate sides of the simulator. In an exemplary training simulation mode, when trainees encounter the repositionable plank 140 configured such that access to the stairs 138 is blocked, they are then forced to traverse through the partition opening 142 and back through the lower left side of the simulator. After passing back to the lower left side of the simulator, trainees encounter hinge-mounted repositionable plank 126 in the closed position. This forces trainees to return to the right side of the trailer before exiting the simulator. As they attempt to return to the right side of the trailer, they pass through restricted partition opening 144. The opening is restricted by a wooden beam mounted diagonally across the restricted partition opening 144. This restriction forces most trainees to remove their breathing apparatus from their backs before proceeding toward to the exit door 148.

Referring now to FIG. 2 and FIG. 3, in an alternate exemplary training simulation mode, trainees encounter the repositionable plank 140 configured such that access to partition opening 142 is blocked and access to the stairs 138 is permitted. Trainees proceed up four stairs to a landing located on the second level 121 of the simulator. The stairs are approximately 7¼ inches by 11 inches, a standard configuration for stair dimensions. There is a landing 168 approximately 96 inches by 38 inches, located at the top of the stairs 138.

Figure 4:
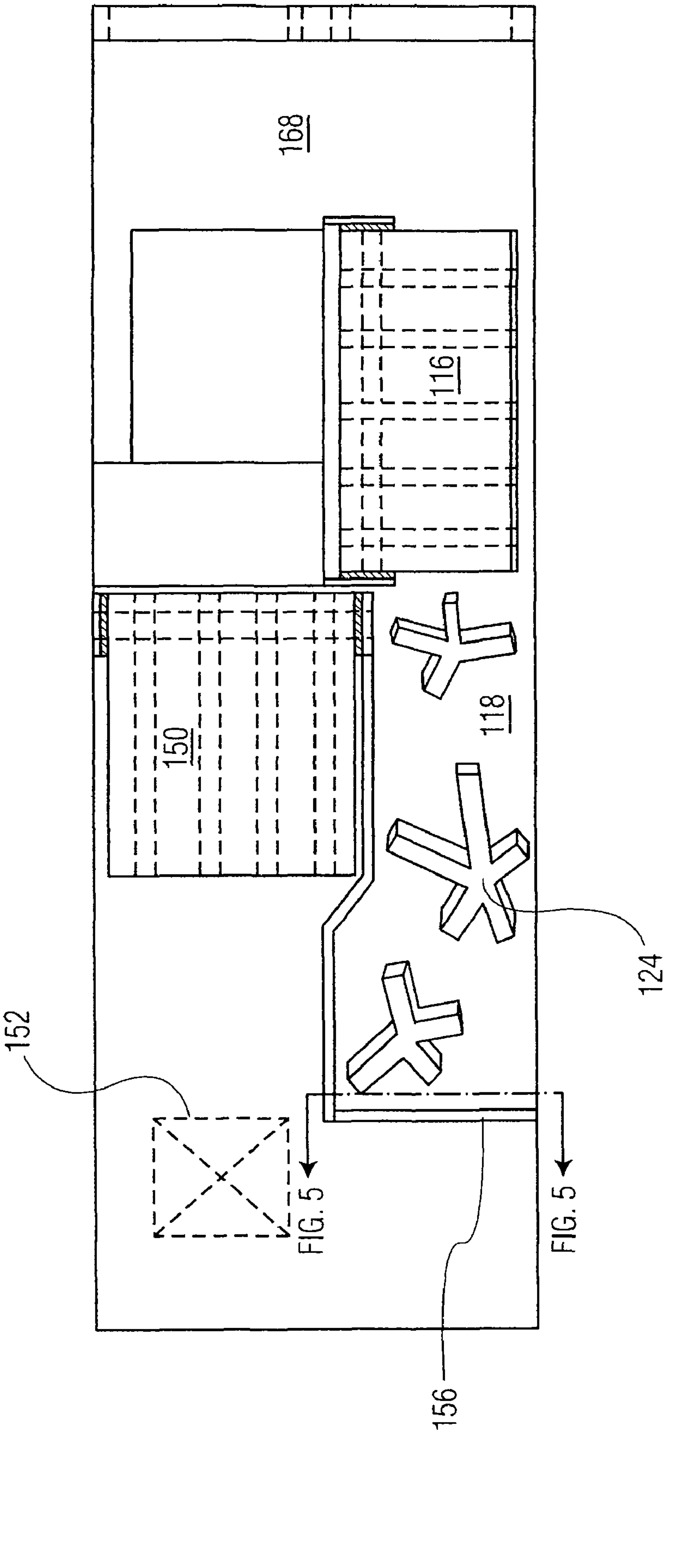
FIG. 4 is a cut away plan view of the second vertical level of the interior of the mobile collapsed building simulator along lines 4-4 shown in FIG. 1.

Referring now to FIG. 3 and FIG. 4, in an exemplary embodiment, as trainees traverse the upper left side of the trailer, trainees next encounter a first wood framework 116 that is configured to simulate a collapsed roof. The wood structure is approximately a 72 inch by 44 inch roof-like framework 116 consisting of plywood mounted on 2 inch by 6 inch joists. All of the beams of one end of the framework have been bored in order to accept a pipe that serves as a hinge for the framework. The pipe is used because traditional hinge configurations are not strong enough to support the framework. In an exemplary embodiment, the first wood framework 116 is configured such that the pipe hinge is mounted parallel to the navigable path. The pipe hinge and first wood framework 116 are mounted such that the wood framework impedes the navigable path at a steep angle. The free end of the first wood framework 116 rests on small blocks that allow limited access for insertion of cribbing material. Weights are optionally affixed to a portion of the framework to make it difficult to lift the structure without specialized tools. Trainees then elevate and stabilize the first wood framework 116 in order to continue traverse the navigable path.

Referring again to FIG. 3 and FIG. 4, as trainees continue along the upper left side of the trailer they traverse a field of debris 118 that makes the navigable path non-negotiable. The debris consists, for example, of assorted odd-shaped pieces of wood 124, some of which have been bolted together. The debris is substantially unpainted. Trainees then decide which pieces of debris only need to be moved out of the way, and which pieces are to be physically removed from the simulator before continued traverse of the path. Debris that is to completely removed from the simulator is transported by trainees all the way back along the navigable path to the exit of the trailer at the back on the lower right side. Although only a few pieces of debris are shown in FIG. 4, it is contemplated that the debris may be sufficient to substantially cover the floor or even to substantially block at least the entrance to the debris field. In another exemplary embodiment, the simulator may comprise additional debris fields.

Figure 5:
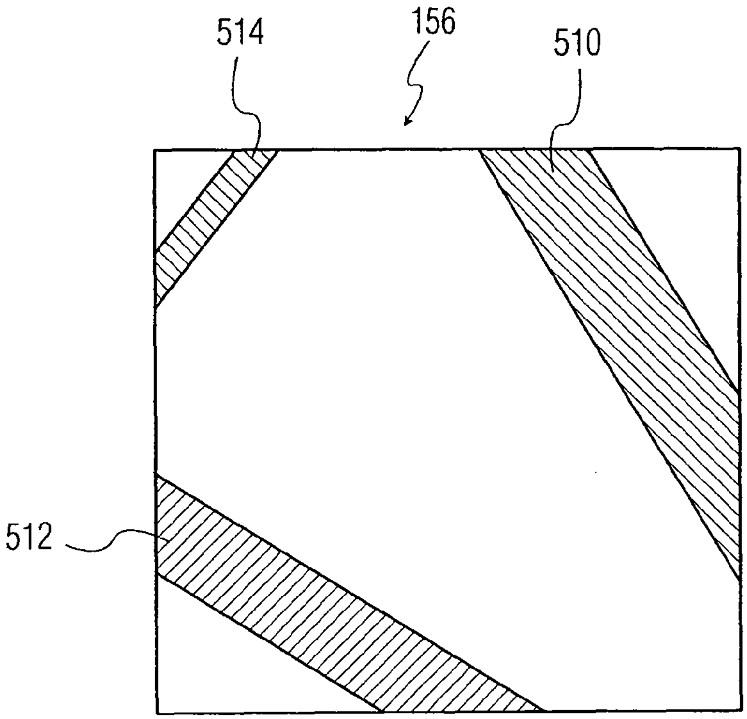
FIG. 5 is an alternate view from the navigable path of the diagonal restriction.

Referring now to FIG. 5, in an exemplary embodiment, as trainees finish traversing the upper left side of the trailer they pass through a restricted opening 156. A plurality of beams 510, 512 and 514 are configured such that at least a portion of each beams lies diagonally across the navigable path. In an exemplary embodiment, this restriction requires trainees to contort their bodies as they traverse the restricted opening.

In an exemplary embodiment, after the debris field, trainees encounter an open space that trainees typically traverse without issue. However, in an advanced exemplary training simulation mode, this open space contains an approximately 24 inch by 24 inch removable plank that serves as a hatch 152. This hatch 152 is located in the floor of the upper right side of the trailer, and can be removed for a rescue simulation that involves the evacuation of a fellow rescuer who has fallen to the lower level 120. Advanced trainees secure the individual to a backboard and then hoist the backboard up through this opening and then traverse the navigable path in reverse to the exit on the lower right side of the trailer. For further realism, the fallen rescuer may be positioned in, or adjacent to the rope entanglements 154.

In an exemplary embodiment, advanced trainees may also be required to locate victims trapped under a second simulated collapsed roof. This second wood framework 150 is similar in design to the first wood framework simulating a roof collapse 116 with the exception that the dimensions are reduced to 60 inch by 60 inch for example. The free end of the second wood framework 150 rests on small blocks that allow limited access for insertion of cribbing material. Weights are optionally affixed to a portion of the framework to make it increasingly difficult to lift the structure. The second wood framework is stabilized in order to rescue a trapped victim. In an exemplary embodiment, the framework 150 configured such that the pipe hinge is mounted perpendicular to the navigable path. Typically, the pipe hinge mounting locations of wood frameworks 116 and 150 are transverse to each other. This presents trainees with alternate elevation and cribbing challenges.

In an exemplary embodiment, simulated smoke may be introduced into the simulator to impede vision and make rescue conditions more realistic. A commercially available smoke generator 132 can be located outside of the trailer in the hitch area. A 110-volt power source and liquid smoke are used to produce smoke. The hot tip of the smoke generating means is introduced through the trailer wall to the navigable path.

In an exemplary embodiment, compressed air may be introduced to navigable path via piping 162 to simulate a gas leak. The piping 162 conduit is configured along the structural framework that divides the length of the trailer. Once advanced trainees become aware of the sound of the compressed air they trace the piping to locate a shut-off valve 160 hidden in a concealed portion of the trailer. For example, trainees may detect a gas leak, while traversing the upper vertical level 121. The trainees may then follow a reverse path through the simulator 100 to locate the shut-off valve 160 on the lower vertical level 120. Alternatively, the compressed air may be shut-off by personnel external to the trailer once the trainees have located the shut-off valve 160.

In an alternate exemplary embodiment, cameras 158 such as infra-red, night vision or thermal imaging may be installed in the trailer. A central command post located external to the simulator may be used to monitor the progress of the trainees. Optionally, there may be two-way radio communication between the central command post and trainees. This communication provides improved instruction as instructors can explain proper rescue techniques as well as help trainees who require assistance. The radios may also be used to enhance the realism of the simulator by providing communications typical of an emergency situation.

Figure 6:
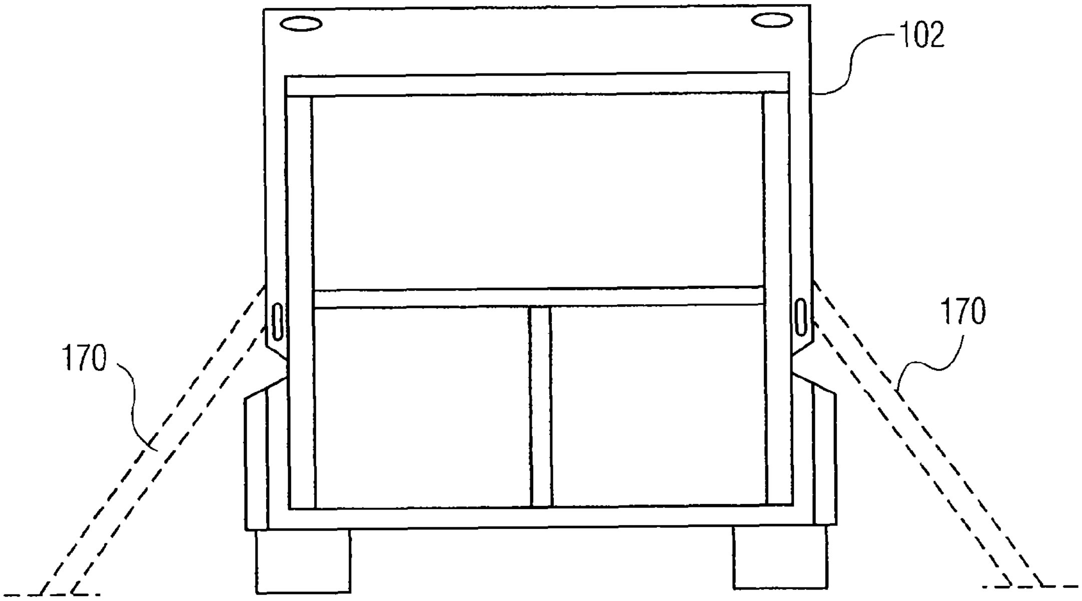
FIG. 6 is a rear view of the mobile collapsed building simulator.

Referring now to FIG. 6, in an alternate exemplary embodiment, at least one set of outriggers 170 may be configured about the exterior of the trailer 102 to simulate a leaning, shifting, or otherwise unstable building. The outriggers 170 may be operated electrically, mechanically, hydraulically, or manually for example, to shift the trailer 102 before or during rescue simulation modes.

In an alternate exemplary embodiment, auditory signals may be triggered as trainees traverse various points along the navigable path. Examples of the auditory signals optionally include screams, sirens, explosions, and the sound of a collapsing structures.

Figure 7:
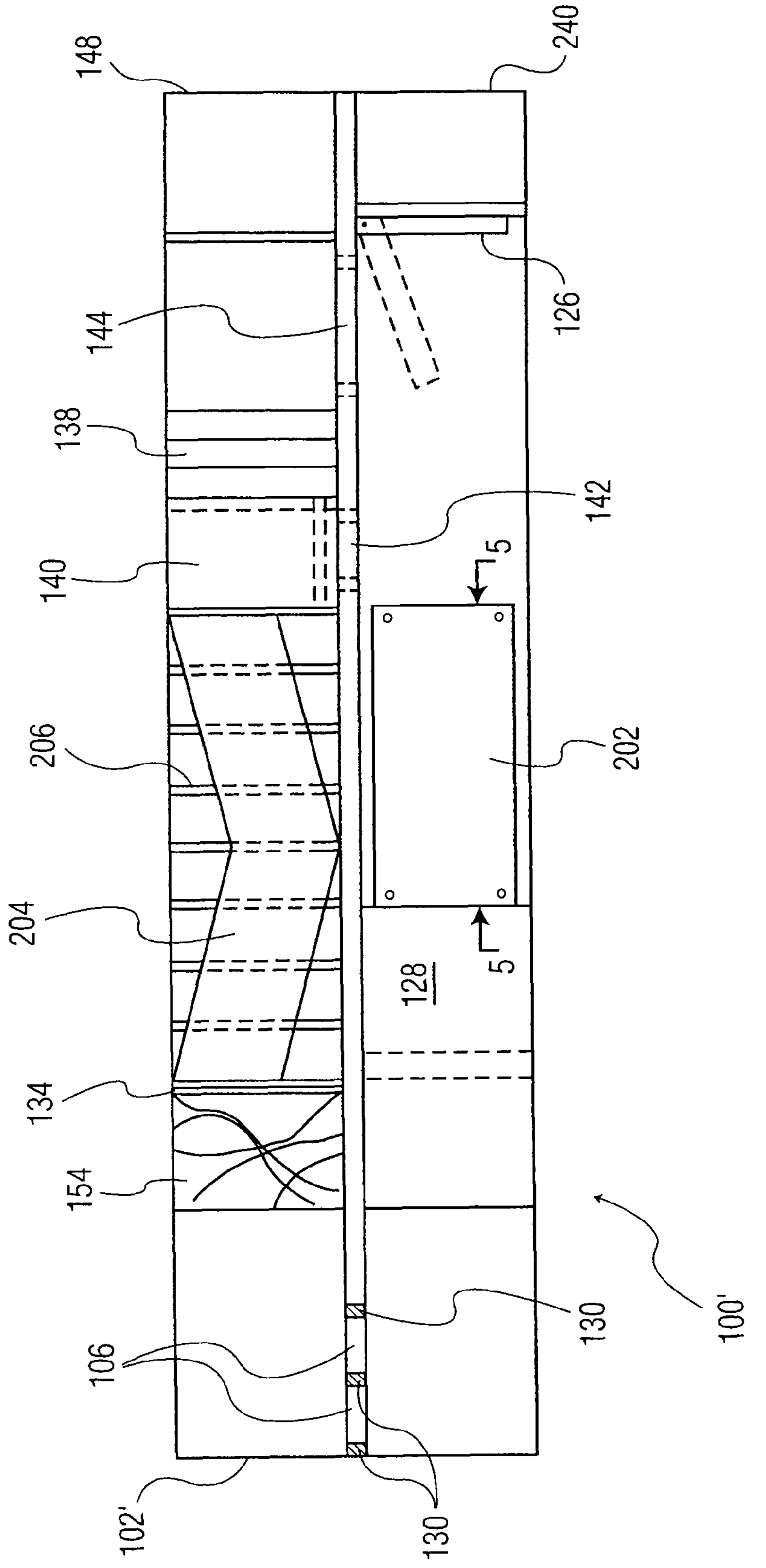
FIG. 7 is a cut away plan view of the first vertical level of the interior of the mobile collapsed building simulator along 2-2, according to another embodiment of the invention.
Figure 10:
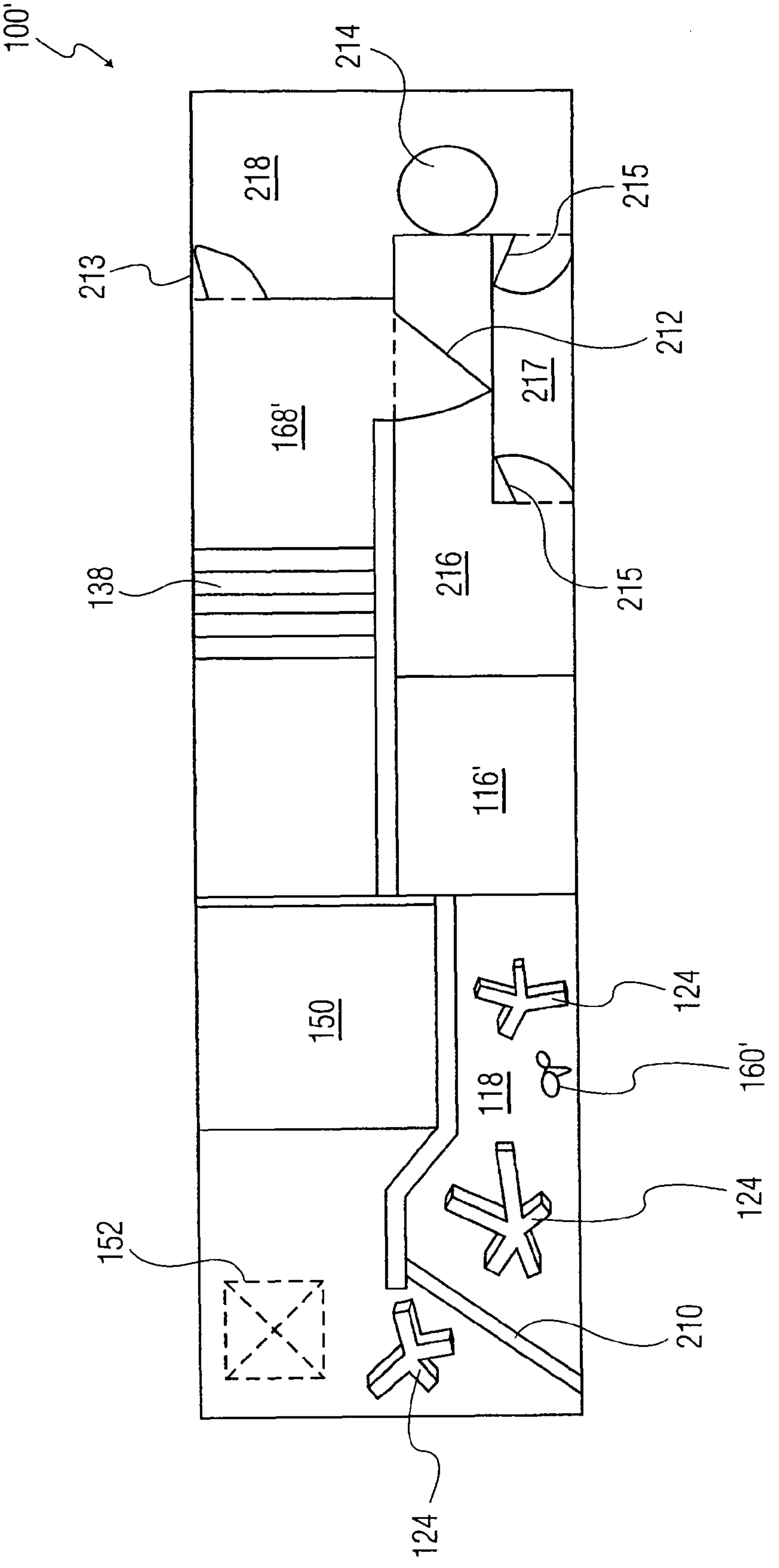
FIG. 10 is a cut away plan view of the second vertical level of the interior of the mobile collapsed building simulator along lines 4-4 shown in FIG. 1, according to another embodiment of the invention.

Referring now to FIG. 7 and FIG. 10, an alternate exemplary embodiment of the mobile collapsed building simulator 100' is provided. The exemplary simulator 100' is the same as simulator 100 except that simulator 100' includes trailer 102' that has approximate dimensions of about 30 feet in length and 8 feet in width. In addition, simulator 100' additionally includes obstacles for simulating a sewer line rescue. The exemplary simulator 100' includes repositionable plank 126, fulcrum-mounted plank 128, dry wall or mortar board 106, wall studs 130, web of rope entanglements 154, concrete or mortar-based wall 134, repositionable plank 140, stairs 138, partition opening 142, restricted partition opening 144, field of debris 118 having pieces of wood 124, second wood framework 150 and hatch 152, which are described above. In addition, simulator 100' includes lower left door 240, restrictive weighted plank 202, pipe 204, beams 206, first wood framework 116', partition 210, vertical pipe 214, first region 216, second region 218, passageway 217, door 212, door 213 and doors 215.

Referring to FIG. 7, trainees typically enter the simulator 100' through lower left door 240. Lower left door 240 is configured as a door and is also configurable to accept a sewer pipe 226, described further below with respect to FIG. 12A. Upon entering the simulator 100', trainees immediately encounter the hinge-mounted repositionable plank 126 that is configured perpendicular to the navigable path such that it completely blocks the navigable path. As described above, the hinge-mounted repositionable plank 126 is configured such that when sufficient force is exerted upon the plank, trainees move the plank aside, and may progress forward along the navigable path.

Figure 8:
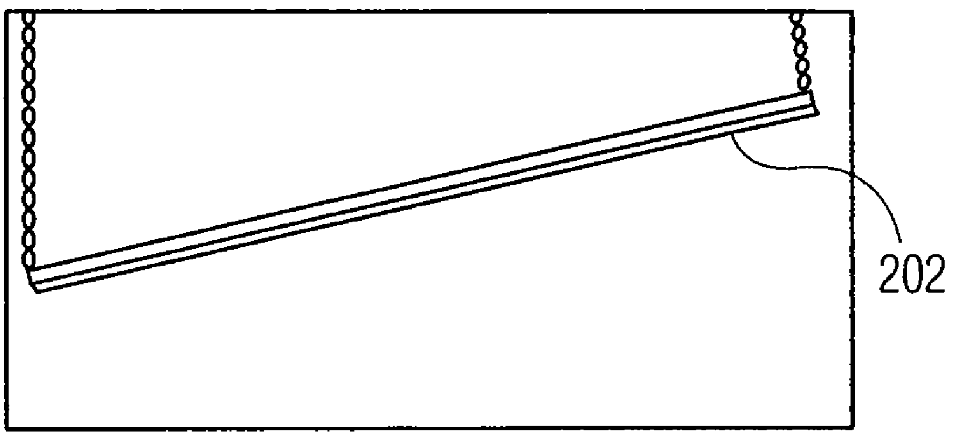
FIG. 8 is a cut away plan view from the navigable path of the restrictive weighted plank along 5-5 shown in FIG. 7, according to another embodiment of the invention.

In an exemplary embodiment, trainees continue to crawl along the navigable path and encounter the first obstacle, the simulated floor drop. Referring to FIG. 8, this exemplary obstacle is an approximately 42 inch wide by 80 inch long restrictive weighted plank 202 that is connected to the bottom of the partition 110 (FIG. 1) which divides the trailer into two vertical levels. The restrictive weighted plank 202 is attached by cable to the ceiling of the trailer at a steep angle. In an exemplary embodiment, the restrictive weighted plank 202 is sloped such that the height of the opening, when continuing along the navigable path, is restricted to 16 inches. In an exemplary embodiment, the restrictive weighted plank 202 is connected to a 60 pound weight. The weight makes it difficult to move the plank and the width of the restrictive weighted plank 202 is nearly the exact width of the navigable path, thereby forcing the trainees to crawl under the restrictive weighted plank 202. The restricted opening at one end of the restrictive weighted plank 202 may be raised or lowered. Additionally plank 202 may be configured to be less than the width of the navigable floor to simulate a partial floor drop. This restricted opening forces most trainees to remove their breathing apparatus from their backs before proceeding toward to the plank 128.

Referring back to FIG. 7, in an exemplary embodiment, trainees next encounter the fulcrum-mounted plank 128 that simulates the floor collapse. As described above, the plank 128 may be configured to be less than the width of the navigable path to simulate a partial floor collapse. The trainees next pass through the series of wall studs 130 as they transition from the lower left side to the lower right side of the simulator 100'. At least a portion of the wall studs may be concealed by dry wall or mortar board 106 that must be demolished before continued traverse along the navigable path.

Trainees next encounter the web of rope entanglements 154 that simulate a collapsed drop-ceiling. In alternate embodiments, the web of entanglements 154 may be replaced by the mortar-based or pre-poured concrete wall 134 that obstructs a majority of the navigable path such that at least a majority of the wall must be substantially breached before continued traverse.

Figure 9:
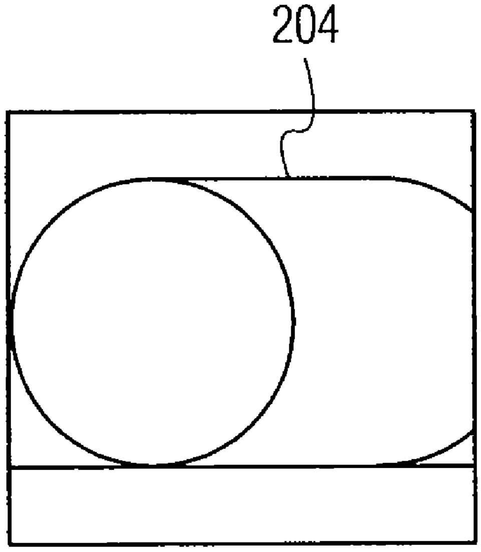
FIG. 9 is a cut away view from the navigable path of the pipe in the first vertical level of the interior of the mobile collapsed building simulator, according to another embodiment of the invention.

In an exemplary embodiment, trainees next encounter a pipe 204 supported by beams 206. The pipe 204 is configured to simulate a sewer line. Referring to FIG. 9, a cross section of the pipe 204 is shown. In an exemplary embodiment, the pipe 204 is approximately 128 inches long with a 28 inch diameter. Referring back to FIG. 7, the pipe 204 is configured to include a bend at approximately 66 inches along the length of the pipe. Trainees encounter the pipe 204 and are forced to crawl through the pipe 204. The bend in the pipe forces the trainees to contort their bodies as they traverse the pipe. Although one bend approximately halfway along the pipe 204 is illustrated, it is contemplated that the pipe 204 may be configured with one or more bends at different locations along the length of the pipe.

In an exemplary embodiment, trainees are next presented with the repositionable plank 140 that may be configured to block access to the stairs 138. As described above, when access to the stairs 138 is blocked by repositionable plank 140, the trainees are forced to traverse through the partition opening 142 and back through the lower left side of the simulator. The trainees then encounter repositionable plank 126 in the closed position. The trainees are forced to return to the right side of the trailer. The trainees first pass through restricted partition opening 144 and exit the simulator by exit door 148.

Referring now to FIG. 10, in an alternate exemplary training simulation mode, trainees encounter the repositionable plank 140 configured such that access to the stairs 138 is permitted. Trainees proceed up four stairs to the landing 168 located on the second level of the simulator 100'.

In an exemplary embodiment, door 212 is configured to allow access to first region 216, door 213 is configured to block access to second region 218 and doors 215 are configured to block access to passageway 217. In an exemplary embodiment, door 212 is approximately 32 inches wide and doors 213 and 215 are each approximately 15 inches wide. The doors 212, 213 and 215 have no handles and may be weighted such that trainees cannot traverse through the second region 218 blocked by door 213 and through the passageway blocked by doors 215.

In an alternative embodiment, door 212 may be configured to block access to the first region 216 and the door 213 may be configured to allow access to the second region 218. In addition, doors 215 may be configured to allow access to the passageway 217. The trainees pass through the second region 218 and then through the passageway 217 toward first region 216. In an exemplary embodiment, the passageway is approximately 6 feet long.

As illustrated in FIG. 10, the second region 218 is non-rectangular shaped and includes an obstacle created by vertical pipe 214 that extends from the roof to the first vertical level 120 of simulator 100' (described further below with respect to FIG. 11 and FIG. 12). The vertical pipe 214 forces trainees to contort their bodies as they pass through the second region 218. In an exemplary embodiment, the vertical pipe 214 produces a passable space in the second region 218 that is approximately 15 inches wide. The restricted opening by door 213 forces most trainees to remove their breathing apparatus from their backs before proceeding through the second region 218. Similarly, the restricted opening by doors 215 forces most trainees to remove their breathing apparatus before traversing through passageway 217 and into the first region 216.

As trainees continue to traverse the upper left side of the trailer, trainees next encounter a first wood framework 116' that is configured to simulate the collapsed roof. The first wood framework 116' is the same as the first wood framework 116 except that the first wood framework 116' is approximately 39 inches by 60 inches. As described above, trainees elevate and stabilize the first wood framework 116' in order to continue traverse of the navigable path.

As trainees continue along the upper left side of the trailer they traverse the field of debris 118 that makes the navigable path non-negotiable. As described above, the debris consists, for example, of assorted odd-shaped pieces of wood 124 where the debris may be sufficient to substantially cover the floor or even to substantially block at least the entrance to the debris field.

As trainees finish traversing the upper left side of the trailer they encounter partition 210 that substantially blocks the exit from the field of debris 118. In an exemplary embodiment, the partition 210 is approximately 44 inches long by 44 inches high and consists of dry wall. At least a portion of the partition 210 must be demolished before continued traverse along the navigable path.

In an exemplary embodiment, after the partition 210, trainees traverse a second field of debris, illustrated by piece of wood 124. Although only one piece of debris is shown in FIG. 10, it is contemplated that the debris may be sufficient to substantially cover the floor.

In an exemplary embodiment, trainees next encounter an open space that trainees typically traverse without issue. In an advanced exemplary training simulation mode, this open space contains a removable plank that serves as the hatch 152. As described above, the hatch 152 can be removed for a rescue simulation that involves the evacuation of a fellow rescuer who has fallen to the lower level of simulator 100'.

In an exemplary embodiment, advanced trainees may also be required to locate victims trapped under the second wood framework 150 that simulates a second collapsed roof. As described above, the trainees stabilize the second wood framework 150 in order to rescue a trapped victim.

After completing the navigable path on the second vertical level, the trainees may traverse a reverse path through the second floor toward the stairs 138. The trainees crawl down the stairs 138 and continue in a reverse path through the first vertical level as described above with respect to FIG. 7 toward exit door 148 or door 240.

In an exemplary embodiment, compressed air may be introduced into the navigable path to simulate a gas leak where, in FIG. 10, a shut-off valve 160' is located in the field of debris 118. As described above, advanced trainees become aware of the sound of the compressed air and locate the shut-off valve 160'.

Figure 11A:
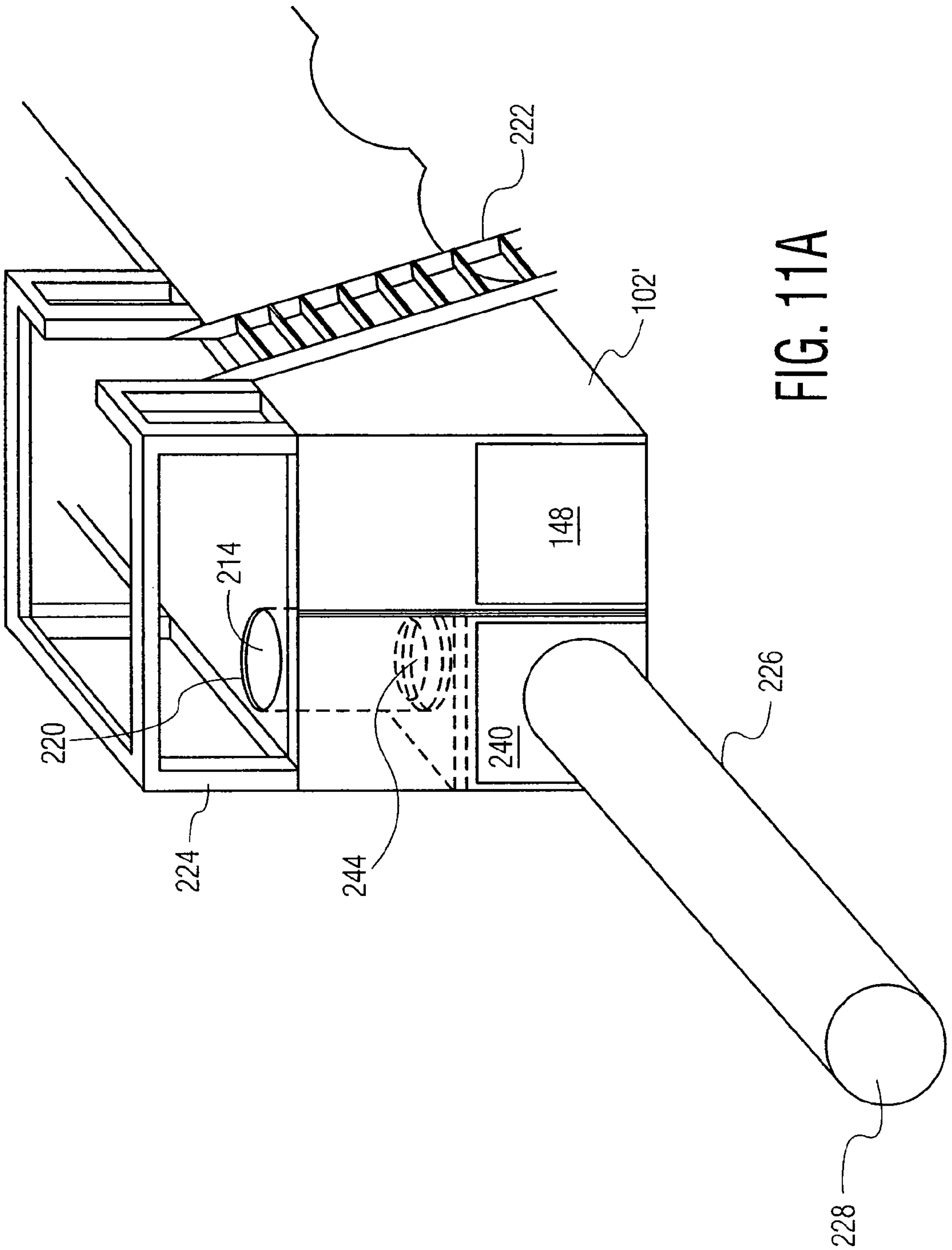
FIG. 11A is a perspective view of the mobile collapsed building simulator for sewer line rescue, according to another embodiment of the invention.
Figure 11B:
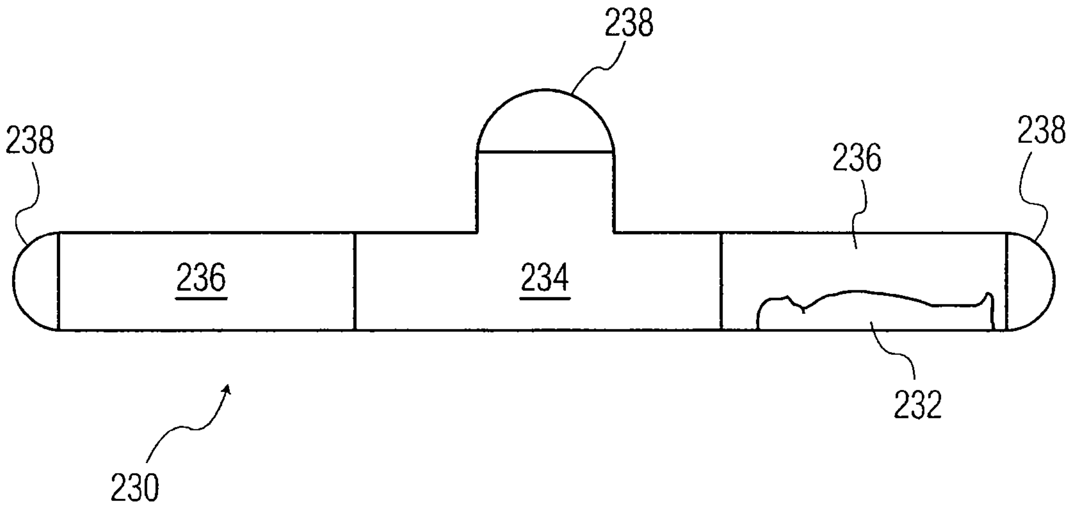
FIG. 11B is a cut away plan view of the sewer pipe enclosure, according to another embodiment of the invention.

Referring now to FIG. 11A and FIG. 11B, in an exemplary embodiment, simulator 100' includes a rescue simulation of a victim trapped in a sewer line. In an exemplary embodiment, an end of sewer pipe 226 is attached to lower left door 240 by a ring and clamp. A person 232 representing a trapped victim is positioned within sewer pipe enclosure 230. An end of the sewer pipe enclosure 230 is configured to be connected with opening 228 of sewer pipe 226. Sewer pipe 226 and sewer pipe enclosure 230 may form a sewer pipe assembly. In an exemplary embodiment, the sewer pipe 226 is approximately 20 feet long and has a diameter of approximately 30 inches.

In this exemplary embodiment, the sewer pipe enclosure 230 includes straight sections of pipe 236, a t-shaped section of pipe 234 and end caps 238. One or more of the end caps 238 may be removed in order to connect the sewer pipe enclosure 230 to sewer pipe 226. Although the sewer pipe enclosure 230 is illustrated as shown in FIG. 12B, it is understood that the straight section of pipe 236 and t-shaped section of pipe 234 may be configured in any suitable arrangement, including more than one t-shaped section of pipe 234. It is contemplated that the sewer pipe enclosure 230 may also include a bend section of pipe, such as pipe 204 shown in FIG. 7. In an exemplary embodiment, the sections 234 and 236 are each approximately 8 feet long and have a diameter of approximately 30 inches.

Trainees typically climb the ladder 222 to the roof of the trailer 102'. The roof of the trailer 102' includes rails 224 that form the observation deck 242. In an exemplary embodiment, the ladder 22 is approximately 9 feet long and 24 inches wide and the observation deck 242 is approximately 8 feet wide and 8 feet long. An opening 220 in the roof of the trailer 102' includes the vertical pipe 214 that extends to the first vertical level in the vicinity of the lower left door 240. In an exemplary embodiment, the vertical pipe 214 has a diameter of approximately 26 inches. The trainees descend vertical pipe 214 to the first vertical level in order to reach the sewer pipe 226 connected to the lower left door 240. A plug 244 is positioned within the vertical pipe 214 between the first and second vertical levels 120 and 121 to block passageway to the first vertical level 120. Trainees first remove the plug 244 before entering the first vertical level 120. The exemplary simulator may include a tripod and a hoist (not shown) to lower trainees down the vertical pipe 214 and to raise trainees and a trapped individual 232 up through the vertical pipe 214.

The trainees traverse through the sewer pipe 226 and then through the sewer pipe enclosure 230 to locate the individual. The trainees then secure the individual to a backboard and again traverse through the sewer pipe enclosure 230 and sewer pipe 226 to the first level of the trailer 102'. The trainees then hoist the backboard up through the vertical pipe 214 to the observation deck 242 of the trailer 102'.

Although the present invention has been described in terms of exemplary embodiments, it is contemplated that it may be practiced as described above with modifications within the scope of the following claims.

What is claimed:

1. A mobile collapsed building simulator comprising:

a trailer body having an interior partitioned into at least two vertical levels defining a navigable path through the trailer body;

a plurality of obstacles configured within said navigable path;

wherein said plurality of obstacles are configured within said navigable path to simulate a collapsed building environment, said collapsed building simulator further comprising a plurality of partitions that divide at least one of said vertical levels defining the navigable path, wherein said plurality of partitions are configured to provide at least two parallel paths in at least a portion of said at least one vertical level and said plurality of partitions are configured to allow traverse from one of said parallel paths to another as said navigable path traverses said parallel paths.

2. The mobile collapsed building simulator according to claim 1 wherein said plurality of obstacles configured within the navigable path comprises:

a hinge-mounted framework assembly of joists and beams extending from an upper surface of a portion of the navigable path, to a lower surface of said portion of the navigable path, the hinge-mounted framework assembly of joists and beams being configured to obstruct the navigable path.

3. The mobile collapsed building simulator according to claim 2 wherein the hinge-mounted framework assembly of joists and beams is configured such that the hinge portion of the hinge-mounted framework assembly of joists and beams is substantially parallel to the longitudinal axis of the trailer body; and whereby at least a portion of the hinge-mounted framework assembly of joists and beams is configured to be elevated by cribbing for continued traverse of the navigable path.

4. The mobile collapsed building simulator according to claim 2 wherein the hinge-mounted framework assembly of joists and beams is configured such that the hinge portion of the hinge-mounted framework assembly of joists and beams is substantially transverse to the longitudinal axis of the trailer body; and whereby at least a portion of the hinge-mounted framework assembly of joists and beams is configured to be elevated by cribbing for continued traverse of the navigable path.

5. The mobile collapsed building simulator according to claim 1 wherein said plurality of obstacles configured within the navigable path comprises a plank mounted on a fulcrum;

said fulcrum being attached to a bottom surface of a portion of the navigable path and being configured such that one end of said fulcrum-mounted plank contacts a portion of the bottom surface of the navigable path while an opposing end of said fulcrum-mounted plank remains in an elevated position;

said plank being configured along the navigable path such that said plank is traversed in order to progress through the navigable path;

wherein said plank is configured such that said elevated end of the plank shifts downward upon traverse of said plank to simulate a floor collapse.

6. The mobile collapsed building simulator according to claim 1 wherein said plurality of obstacles configured within the navigable path comprises:

at least one series of line entanglements which includes a plurality of flexible lines connected at a first end to an upper surface of a portion of the navigable path and at a second end to a lower surface of the portion of the navigable path, the flexible lines being configured to ensnare at least a portion of equipment worn by a first responder upon traverse of the navigable path.

7. The mobile collapsed building simulator according to claim 6 further comprising at least one additional series of line entanglements configured transverse to the first series of line entanglements.

8. The mobile collapsed building simulator according to claim 6 wherein said flexible lines include a plurality of ropes.

9. The mobile collapsed building simulator according to claim 6 wherein the at least one series of line entanglements is configured such that at least a portion of the line entanglements is positioned diagonally across at least a portion of the navigable path.

10. The mobile collapsed building simulator according to claim 1 wherein said plurality of obstacles configured within the navigable path comprises:

a wall substantially obstructing the navigable path;

wherein said wall is configured such that a substantial portion of said wall must be demolished to allow further traverse of the navigable path.

11. The mobile collapsed building simulator according to claim 10 wherein the wall is composed of dry wall or concrete.

12. The mobile collapsed building simulator according to claim 1 further including:

a plurality of movable objects configured to impede traverse of the navigable path, and wherein at least some of said movable objects are sized to be removed from the simulator before continued traverse of the navigable path.

13. The mobile collapsed building simulator according to claim 12 wherein said plurality of movable objects include obstacles having at least one of a different shape, a different size or a different weight than another one of said plurality of movable objects.

14. The mobile collapsed building simulator according to claim 12 wherein at least one movable object of said plurality of movable objects is sized such that the at least one movable object can not be removed from the navigable path.

15. The mobile collapsed building simulator according to claim 1 further including a smoke generator is configured to introduce smoke into the interior of the trailer body.

16. The mobile collapsed building simulator according to claim 1 wherein said plurality of obstacles configured within the navigable path includes a set of joists mounted to a bottom surface of a portion of the navigable path, wherein said set of joists is configured to impede the traverse of the navigable path.

17. The mobile collapsed building simulator according to claim 1 wherein the at least one segment of said plurality of partitions divides said vertical levels into parallel paths containing closely-positioned wall studs configured between the parallel paths to hamper traverse along the navigable path between the parallel paths.

18. The mobile collapsed building simulator according to claim 17 wherein at least a portion of said wall studs is obscured by a covering selected from a group consisting of dry wall, plaster or mortar; and said covering is configured to be removed before traverse through the navigable path.

19. The mobile collapsed building simulator according to claim 1 wherein a portion of the navigable path comprises at least one fixed diagonal beam positioned across the navigable path and configured to impede traverse along the navigable path.

20. The mobile collapsed building simulator according to claim 1 wherein said plurality of obstacles configured within the navigable path comprises:

a plank substantially obstructing the navigable path and configured to be repositioned before further traverse along the navigable path;

said plank being connected to a set of weights; and said weights being configured such that, after repositioning the plank in order to traverse said movable path, said weights bias the plank to return the plank to substantially obstruct the navigable path.

21. The mobile collapsed building simulator according to claim 1 wherein the navigable path further includes stairs connecting the vertical levels.

22. The mobile collapsed building simulator according to claim 1 wherein said plurality of obstacles configured within the navigable path comprises:

at least one plank located in the navigable path being configured to be repositioned to alter the course of the navigable path.

23. The mobile collapsed building simulator according to claim 22 wherein said plank located in the navigable path is configured within at least one of said plurality of partitions.

24. The mobile collapsed building simulator according to claim 1 wherein said navigable path comprises a removable floor plank located on an upper one of the at least two vertical levels;

said removable floor plank defining a void; and said void being configured to allow access to a lower one of at least two vertical levels.

25. The mobile collapsed building simulator according to claim 1 further including:

piping for delivering compressed air to the navigable path by pipe to simulate a gas leak;

a shut-off valve, coupled to the piping and located on a lower vertical level of the at least two vertical levels; and at least one opening in the pipe, simulating a leak, configured on an upper vertical level of the at least two vertical levels.

26. The mobile collapsed building simulator according to claim 1 wherein the navigable path further comprises a plurality of cameras mounted in the navigable path wherein said plurality of cameras are selected from the group consisting of:

visible light cameras, thermal cameras, infra-red cameras, and night-vision cameras.

27. The mobile collapsed building simulator according to claim 26 wherein said plurality of cameras are used to monitor, track, teach and critique trainees.

28. The mobile collapsed building simulator according to claim 1, further comprising one or more sets of outriggers configured to shift an orientation of the trailer body.

29. The mobile collapsed building simulator according to claim 1, wherein said plurality of obstacles configured within the navigable path comprises:

a plank substantially restricting a height of the navigable path;

said plank being connected to a weight;

wherein the height of the navigable path is narrowly defined by a portion of the plank to require traverse in a crouched or crawling position under the plank to simulate a floor drop.

30. The mobile collapsed building simulator according to claim 1, wherein said plurality of obstacles configured within the navigable path comprise:

a pipe extending substantially parallel to a longitudinal axis of the trailer body, the pipe including at least one bend relative to a length of the pipe, wherein traverse through the pipe simulates traverse through a sewer pipe.

31. The mobile collapsed building simulator according to claim 1, wherein said navigable path comprises a vertical pipe extending from a roof of the trailer body to a lower level of the at least two vertical levels;

said vertical pipe configured to allow access to the lower vertical level.

32. The mobile collapsed building simulator according to claim 31, further comprising a sewer pipe assembly configured to be attached to the lower vertical level in the vicinity of the vertical pipe;

wherein traverse through said vertical pipe and said sewer pipe assembly simulates a sewer line rescue.

33. The mobile collapsed building simulator according to claim 31, wherein the sewer pipe assembly includes at least one of a straight pipe section, a t-shaped pipe section or an end cap connected in predetermined configuration.

34. A mobile collapsed building simulator comprising:

a generally rectangular trailer body sized to fit within an engine bay of a firehouse;

said trailer body having an interior partitioned into at least an upper vertical level and a lower vertical level;

a plurality of partitions dividing at least one of said vertical levels into a navigable path; and a plurality of obstacles simulating a collapsed building environment;

said plurality of obstacles containing at least one hinge-mounted framework assembly of joists and beams configured to obstruct the majority of the width of the navigable path; being configured such that a portion is elevated by cribbing before further traverse of the navigable path;

wherein the height of said navigable path is narrowly defined to require traverse in a crouched or crawling position.

35. The mobile collapsed building simulator according to claim 34, further comprising:

a vertical pipe extending from a roof of the trailer body to a lower level of the at least two vertical levels; said vertical pipe configured to allow access to the lower vertical level; and a sewer pipe assembly configured to be attached to the lower vertical level in the vicinity of the vertical pipe, wherein traverse through said vertical pipe and said sewer pipe assembly simulates a sewer line rescue.

* * * * *